US012625451B2

(12) United States Patent
Hara et al.

(10) Patent No.: US 12,625,451 B2
(45) Date of Patent: May 12, 2026

(54) SOUND DIAGNOSTIC SYSTEM

(71) Applicant: CANON KABUSHIKI KAISHA, Tokyo (JP)

(72) Inventors: Seiji Hara, Shizuoka (JP); Yohei Suzuki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 18/932,854

(22) Filed: Oct. 31, 2024

(65) Prior Publication Data

US 2025/0189920 A1 Jun. 12, 2025

(30) Foreign Application Priority Data

Dec. 6, 2023 (JP) ................................ 2023-206317

(51) Int. Cl.
*G03G 15/00* (2006.01)

(52) U.S. Cl.
CPC ......... *G03G 15/55* (2013.01); *G03G 15/5016* (2013.01); *G03G 2215/00637* (2013.01)

(58) Field of Classification Search
CPC ........... G03G 15/5016; G03G 15/5075; G03G 15/5079; G03G 15/55; G03G 2215/00637
See application file for complete search history.

(56) References Cited

U.S. PATENT DOCUMENTS 10,120,321 B2 11/2018 Mori et al.
11,514,283 B2 11/2022 Suzuki et al.
11,842,095 B2 12/2023 Suzuki
2019/0187601 A1* 6/2019 Seki ......................... H04R 1/08
2019/0302671 A1* 10/2019 Eguchi ................... G03G 15/55
2020/0310318 A1* 10/2020 Suzuki ................. G03G 15/553
2023/0300258 A1 9/2023 Suzuki et al.
2023/0308552 A1 9/2023 Hirayama
2023/0350614 A1* 11/2023 Suzuki .................. G06F 3/1229
2023/0393515 A1* 12/2023 Hara .................. G03G 15/5008
2024/0061625 A1 2/2024 Suzuki
2025/0310443 A1* 10/2025 Sugi ................... H04N 1/00037

FOREIGN PATENT DOCUMENTS

JP 2008-032948 A 2/2008
JP 2023-136852 A 9/2023
JP 2023-139922 A 10/2023

* cited by examiner

*Primary Examiner* — Carla J Therrien
(74) *Attorney, Agent, or Firm* — Venable LLP

(57) ABSTRACT

A sound diagnostic system includes an image forming apparatus and an information processing apparatus. The image forming apparatus includes operating portions, a sound collector for collecting a sonic wave, an acquiring portion, in each of a plurality of time sections when the sonic wave is collected by the sound collector, for acquiring a data including sonic wave level and an operating state of the operating portions. The information processing apparatus includes a generator for generating a threshold by adding a predetermined value to a first sonic wave level based on the sonic wave in a first period. The information processing apparatus determines a cause of an abnormal sound by comparing a second sonic wave level based on the sonic wave in a second period after the first period and the threshold. The predetermined value is set so as to be smaller as the first sonic wave level is larger.

6 Claims, 15 Drawing Sheets

(a)

| | | SECTION | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| FEEDING MORTOR | DRV STATE | ON | ON | ON | ON | OFF | OFF | OFF | OFF | OFF | OFF | OFF | OFF | OFF | OFF | OFF | OFF |
| | THRSHLD RNG | ✓ | ✓ | ✓ | ✓ | – | – | – | ✓ | – | – | ✓ | ✓ | ✓ | ✓ | ✓ | ✓ |
| PHTSNSTV MOTOR | DRV STATE | ON | ON | ON | ON | ON | ON | ON | ON | ON | ON | OFF | OFF | OFF | OFF | OFF | OFF |
| | THRSHLD RNG | ✓ | ✓ | ✓ | ✓ | ✓ | ✓ | ✓ | ✓ | ✓ | – | ✓ | ✓ | ✓ | ✓ | ✓ | ✓ |
| FIXING MORTOR | DRV STATE | ON | ON | ON | ON | ON | ON | ON | ON | ON | ON | ON | ON | ON | ON | OFF | OFF |
| | THRSHLD RNG | ✓ | ✓ | ✓ | ✓ | ✓ | ✓ | ✓ | ✓ | ✓ | – | – | – | – | – | ✓ | ✓ |

(b)

| | | OPERATION ON | | | OPERATION OFF | | | SUMMED CNFRMNG RATE (B+D)/(A+C) |
|---|---|---|---|---|---|---|---|---|
| | | NUM OF SECTION A | NUM OF SECTION B | CNFRMNG RATIO B/A | NUM OF SECTION C | NUM OF SECTION D | CNFRMNG RATIO D/C | |
| FEEDING MORTOR | DRV STATE / THRSHLD RNG | 4 | 4 | 100.0% | 12 | 7 | 58.3% | 68.8% |
| PHTSNSTV MOTOR | DRV STATE / THRSHLD RNG | 10 | 9 | 90.0% | 6 | 6 | 100.0% | 93.8% |
| FIXING MORTOR | DRV STATE / THRSHLD RNG | 14 | 9 | 64.3% | 2 | 2 | 100.0% | 68.8% |

FIG. 9

(a)

| | | SECTION | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| PHTSNSTV MOTOR | DRV STATE | ON | ON | ON | ON | ON | ON | ON | ON | ON | ON | OFF | OFF | OFF | OFF | OFF | OFF |
| | 1ST THRSHLD RNG | – | – | – | – | – | – | – | – | – | – | ✓ | ✓ | ✓ | ✓ | ✓ | ✓ |
| | 2ND THRSHLD RNG | ✓ | ✓ | ✓ | ✓ | ✓ | ✓ | ✓ | ✓ | ✓ | ✓ | ✓ | ✓ | ✓ | ✓ | ✓ | ✓ |

(b)

| | | OPERATION ON | | | OPERATION OFF | | | SUMMED CNFRMNG RATE (B+D)/(A+C) |
|---|---|---|---|---|---|---|---|---|
| | | NUM OF SECTION A | NUM OF SECTION B | CNFRMNG RATIO B/A | NUM OF SECTION C | NUM OF SECTION D | CNFRMNG RATIO D/C | |
| PHTSNSTV MOTOR | DRV STATE | | | | | | | |
| | 1ST THRSHLD RNG | 10 | 0 | 0.0% | 6 | 6 | 100.0% | 37.5% |
| | 2ND THRSHLD RNG | 10 | 9 | 90.0% | 6 | 6 | 100.0% | 93.8% |

FIG. 12

(a)

| PHTSNSTV MOTOR | | SECTION | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| NO MASH | DRV STATE | ON | ON | ON | ON | ON | ON | ON | ON | ON | ON | OFF | OFF | OFF | OFF | OFF | OFF |
| | THRSHLD RNG | ✓ | ✓ | ✓ | ✓ | ✓ | ✓ | ✓ | – | ✓ | – | ✓ | ✓ | ✓ | ✓ | ✓ | ✓ |
| MASH (EMBDMNT) | DRV STATE | ON | ON | ON | ON | ON | ON | ON | | ON | ON | OFF | OFF | OFF | OFF | OFF | OFF |
| | THRSHLD RNG | ✓ | ✓ | ✓ | ✓ | ✓ | ✓ | ✓ | | ✓ | – | ✓ | ✓ | ✓ | ✓ | ✓ | ✓ |

(b)

| PHTSNSTV MOTOR | | OPERATION ON | | | OPERATION OFF | | | SUMMED CNFRMNG RATE |
|---|---|---|---|---|---|---|---|---|
| | | NUM OF SECTION | NUMBER OF SECTION WITHIN RANGE | CNFRMNG RATIO | NUM OF SECTION | NUMBER OF SECTION WITHIN RANGE | CNFRMNG RATIO | |
| NO MASH | DRV STATE / THRSHLD RNG | 10 | 8 | 80.0% | 6 | 6 | 100.0% | 87.5% |
| MASH (EMBDMNT) | DRV STATE / THRSHLD RNG | 9 | 8 | 88.9% | 6 | 6 | 100.0% | 93.3% |

FIG. 14

SOUND DIAGNOSTIC SYSTEM

FIELD OF THE INVENTION AND RELATED ART

The present invention relates to a sound diagnostic system for determining presence or absence of an abnormal sound.

In an image forming apparatus such as a copy machine and a laser printer, if a component reaching an end of life thereof continues to be used without being replaced, the abnormal sound may be generated from such a component. In Japanese Patent Application Laid-Open No. 2008-032948, a component which is generating an abnormal sound in an image forming apparatus is identified. Specifically, by analyzing a frequency of detected sound, the component which is generating the abnormal sound is identified based on the frequency and a peak value of sound pressure level at that frequency.

SUMMARY OF THE INVENTION

However, when a plurality of components are in operation simultaneously, frequency bands of each component may overlap, and it may be difficult to identify the component which is generating the abnormal sound using the conventional identification method.

Therefore, an object of the present invention is to determine a cause of an abnormal sound with high accuracy.

In order to solve the aforementioned problems, the present invention includes the following configuration.

A sound diagnostic system comprising an image forming apparatus for forming an image on a recording material and an information processing apparatus capable of communicating with the image forming apparatus, wherein the image forming apparatus comprises: one or more operating portions; a sound collecting portion configured to collect a sonic wave so as to include a period when the operating portion is in operation; an acquiring portion, in each of a plurality of time sections when the sonic wave is collected by the sound collecting portion, configured to acquire a data including sonic wave level based on the sonic wave and an operating state of the one or more operating portions; and a transmission portion configured to transmit the date to the information processing apparatus, and wherein the information processing apparatus comprises: a receiving portion configured to receive the data; a threshold value generating portion configured to generate a threshold value by adding a predetermined value to a first sonic wave level which is the sonic wave level based on the sonic wave collected by the sound collecting portion in a first period; and a determining portion configured to determine a cause of an abnormal sound by comparing a second sonic wave level which is the sonic wave level based on the sonic wave collected by the sound collecting portion in a second period after the first period and the threshold value, and wherein the predetermined value is set so as to be smaller as the first sonic wave level is larger.

Further features of the present invention will become apparent from the following description of exemplary embodiments with reference to the attached drawings.

BRIEF DESCRIPTION OF THE DRAWINGS

FIG. 9 is a view illustrating whether or not the statistic is within the threshold range for each section in the Embodiment 1.

FIG. 12 is a view illustrating whether or not the statistic is within the threshold range for each section in the Embodiment 2.

FIG. 14 is a view illustrating whether or not the statistic is within the threshold range for each section in the Embodiment 3.

DESCRIPTION OF THE EMBODIMENTS

Hereinafter, suitable Embodiments of the present invention will be exemplarily described in detail with reference to the drawings. However, dimensions, material, shapes and relative dispositions of components described below should be changed as appropriate depending on a configuration of an apparatus to which the present invention is applied and various other conditions. Therefore, unless otherwise specifically stated, it is not intended to limit the scope of the present invention thereto alone.

Embodiment 1

[Description for an Image Forming Apparatus]

Figure 1:
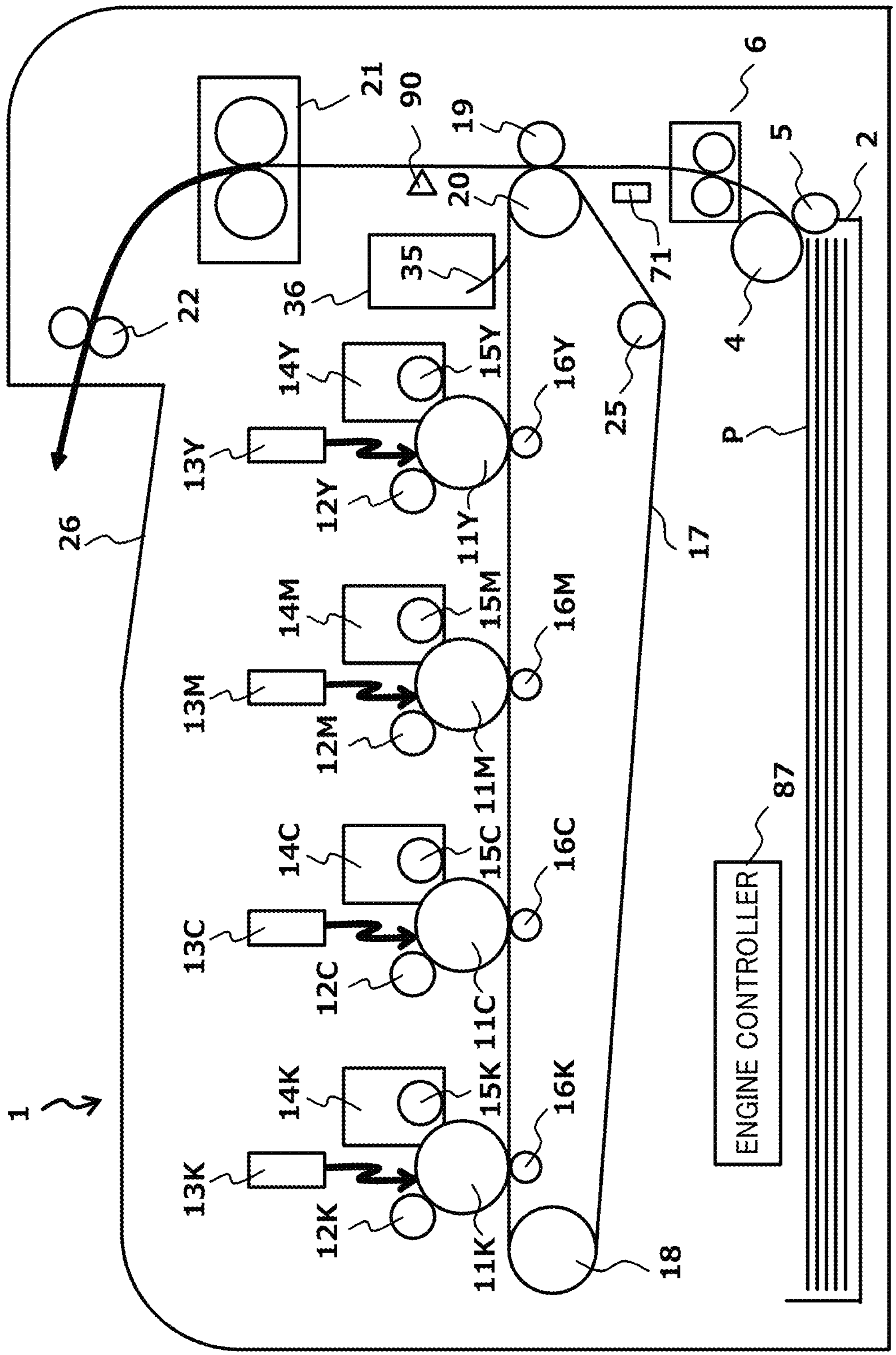
FIG. 1 is a schematic view of an image forming apparatus in Embodiments 1 through 3.

Hereinafter, using drawings, an image forming apparatus 1, which is included in a sound diagnostic system 100 and forms an image on a recording material, will be described. Here, for example, a color image forming apparatus of electrophotographic type is exemplarily described. FIG. 1 is a configuration view illustrating the example of a color image forming apparatus of tandem type employing an intermediary transfer belt.

Each configuration of the image forming apparatus 1 in FIG. 1 is as following. A feeding cassette 2 is an accommodating portion which accommodates a recording material P. An engine control portion 87 controls an image forming operation of the image forming apparatus 1. A feeding roller 4 feeds the recording material P from the feeding cassette 2. Upon feeding the recording material P from the feeding cassette 2 by the feeding roller 4, a separating roller 5 separates and feeds the recording material P one sheet at a time. A conveyance roller pair 6 as a conveyance portion conveys the fed recording material P. Photosensitive drums 11Y, 11M, 11C and 11K are image bearing members which bear electrostatic latent images of each color of yellow, magenta, cyan and black, respectively. Charging rollers 12Y, 12M, 12C and 12K are primary charging means for each color to uniformly charge the photosensitive drums 11Y, 11M, 11C and 11K to predetermined potential. Optical units 13Y, 13M, 13C and 13K form the electrostatic latent images by irradiating the photosensitive drums 11Y, 11M, 11C and 11K, which are charged by the charging rollers 12Y, 12M, 12C and 12K, with laser beams corresponding to image data of each color. Developing units 14Y, 14M, 14C and 14K are developing means for visualizing the electrostatic latent images formed on the photosensitive drums 11Y, 11M, 11C and 11K. The developing units 14Y through 14K include the developer and developing rollers 15Y through 15K, respectively. The developing rollers 15Y, 15M, 15C and 15K are developer carrying members for developing/supplying the developer in the developing units 14Y, 14M, 14C and 14K onto the photosensitive drums 11Y, 11M, 11C and 11K to develop the electrostatic latent image. Primary transfer rollers 16Y, 16M, 16C and 16K are primary transfer means which primary transfer images formed on the photosensitive drums 11Y, 11M, 11C and 11K, respectively, onto an intermediary transfer belt 17. The intermediary transfer belt 17 is an intermediary transfer member which carries the primary transferred image from each photosensitive drum 11Y through 11K. A driving roller 18 drives the intermediary transfer belt 17. A tension roller 25 applies tension to the intermediary transfer belt 17. A secondary transfer roller 19 transfers the image formed on the intermediary transfer belt 17 to the recording material P. A secondary transfer opposite roller 20 opposes the secondary transfer roller 19 via the intermediary transfer belt 17. A fixing unit 21 is a fixing means which melts and fixes the developer image, which is transferred to the recording material P, onto the recording material P while conveying the recording material P. A discharging roller pair 22 discharges the recording material P, onto which the fixing of the image has been performed by the fixing unit 21, to a discharge tray 26. Incidentally, on the intermediary transfer belt 17, a belt cleaning device 36, which scrapes off developer remaining on the intermediary transfer belt 17 after the transfer with a cleaning member such as a cleaning blade 35 installed inside the belt cleaning device 36, is installed and prepares the intermediary transfer belt 17 for the next image formation.

To the engine control portion 87, a CPU 80 (see FIG. 2) is installed and collectively controls the image forming operation of the image forming apparatus 1. Upon print data containing a print instruction, image information, etc. being input to the engine control portion 87 from a host computer HC, which will be described below, etc., the image forming apparatus 1 starts a print operation.

In the image forming apparatus 1 in FIG. 1, a sound collector 71 is disposed near a conveyance path which conveys the recording material P. The sound collector 71 is a sound collecting portion (receiving portion) capable of collecting a sonic wave (sound).

The sound collector 71 is constituted by a MEMS (Micro Electro Mechanical System) microphone and electrode terminals which converts vibration displacement of a diaphragm due to pressure into a voltage change and outputs the voltage change. The signal output from the sound collector 71 (sound collecting portion) is transmitted to the engine control portion 87.

In addition, the image forming apparatus 1 also includes a recording material detecting portion 90. The recording material detecting portion 90 is disposed near the conveyance path. The recording material detecting portion 90 detects the recording material which passes through the recording material detecting portion 90 and transmits a detection result to the engine control portion 87.

[Description for the Sound Diagnostic System]

Figure 2:
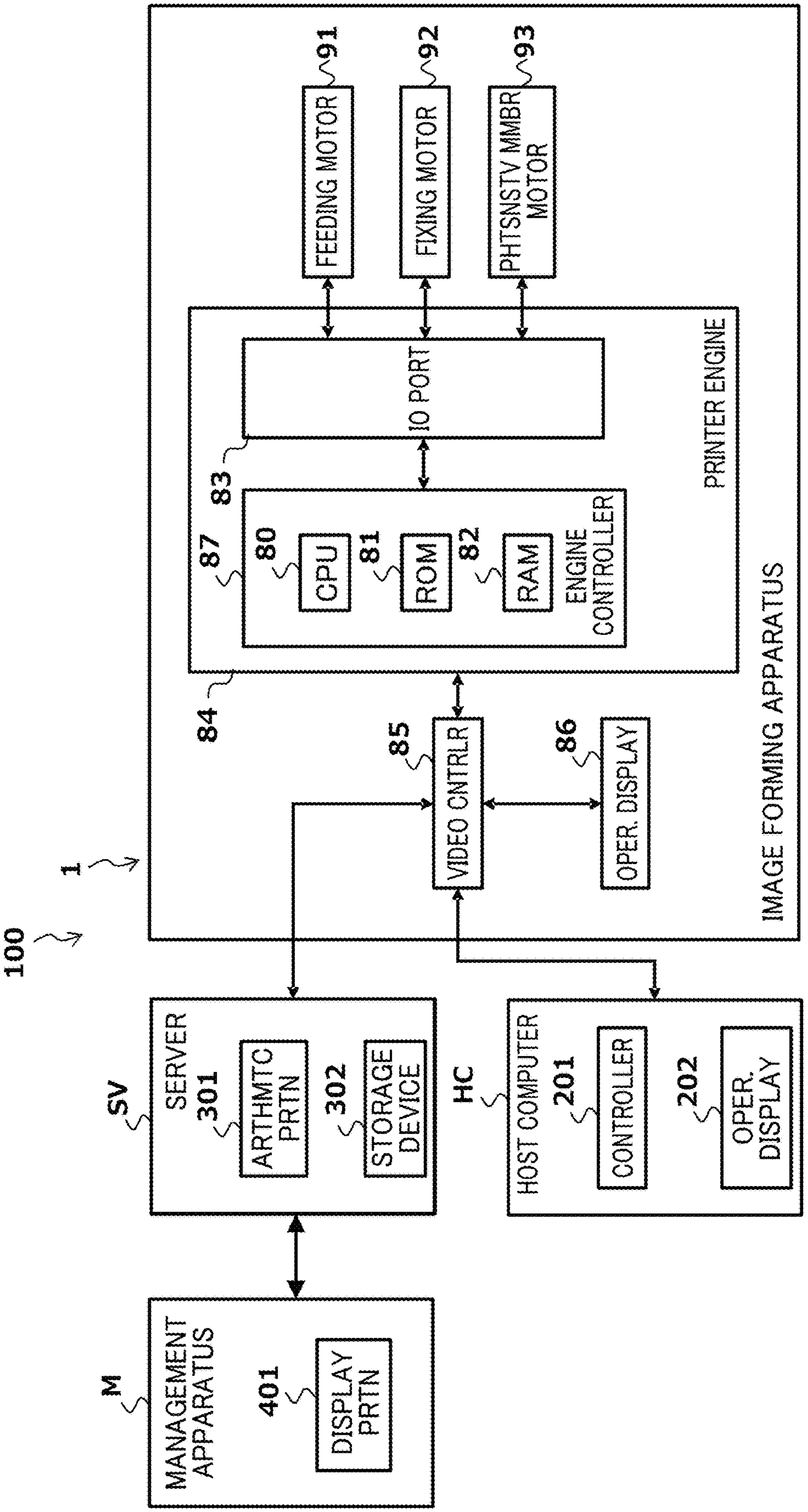
FIG. 2 is a schematic diagram of a sound diagnostic system in the Embodiments 1 through 3.

FIG. 2 is a configuration view of the sound diagnostic system 100 (image forming apparatus system) including the image forming apparatus 1 according to the present Embodiment. The sound diagnostic system 100 includes the image forming apparatus 1, a server SV and a management apparatus M. As shown in FIG. 2, the image forming apparatus 1 is capable of communicating with the host computer HC and the server SV (information processing apparatus) via a network. In addition, the server SV is also capable of communicating with the management apparatus M.

A control portion 201 of the host computer HC includes a CPU, which is a processor, and performs various processes by executing control programs stored in a storage device not shown. An operation display portion 202 includes a display, a keyboard, a mouse, etc., and provides a user interface. For example, the control portion 201, in response to user's operation on the operation display portion 202, transmits a print job containing the image data to a video controller 85, which will be described below, to cause the image forming apparatus 1 to form the image based on the image data. The image forming apparatus 1 is provided with the video controller 85, an operation display portion 86, a printer engine 84, a feeding motor 91, a fixing motor 92 and a photosensitive member motor 93.

When the video controller 85 of the image forming apparatus 1 receives the print job from the host computer HC, the video controller 85 causes the printer engine 84 to control the image formation based on the print job. The operation display portion 86 includes an operation panel, operating buttons, etc., and provides a user interface. The printer engine 84 includes the engine control portion 87, which includes the CPU 80, which is a processor, a ROM 81 and a RAM 82. The ROM 81 is a nonvolatile memory which holds and stores the control programs and various data. Incidentally, a rewritable nonvolatile memory may be used instead of the ROM 81. The RAM 82 is a volatile memory which stores temporary data. The CPU 80 controls the feeding motor 91, the fixing motor 92 and the photosensitive member motor 93 via an IO port 83 by executing the control programs stored in the ROM 81.

The image forming apparatus 1 includes one or more motors (operating portions). The feeding motor 91 is a driving source for the feeding roller 4 and the conveyance roller pair 6. The photosensitive member motor 93 is a driving source for the driving roller 18, the photosensitive drum 11 and the developing roller 15. The fixing motor 92 is a driving source for a pressing roller of the fixing unit 21. That is, the feeding roller 4, the conveyance roller pair 6, the driving roller 18, the photosensitive drum 11, the developing roller 15 and the pressing roller are components driven by the motors. These components driven by the motors (actuators) may generate an abnormal sound due to a cause such as deterioration.

The server SV is provided with an arithmetic portion 301 and a storage device 302. The arithmetic portion 301 includes one or more processors (CPUs) and performs a process for an abnormal sound analysis, which will be described below, by executing control programs stored in the storage device 302. The storage device 302 includes any volatile and non-volatile storage devices. The storage device 302 stores not only the programs executed by the arithmetic portion 301, but also data used by the arithmetic portion 301 in the abnormal sound analysis. Specifically, the storage device 302 receives and stores sound data, which will be described below, transmitted from the image forming apparatus 1. Incidentally, in the present Embodiment, it is the server SV that is provided with the arithmetic portion 301 and the storage device 302, however, functions of the arithmetic portion 301 and the storage device 302 may be configured to be distributed in at least one or more servers. In addition, the arithmetic portion 301 and the storage device 302 may be provided to the image forming apparatus 1, and the abnormal sound analysis, which will be described below, may be performed by the image forming apparatus 1.

The server SV transmits (notifies) information on a determined result of the arithmetic portion 301 and countermeasure information on the determined result to the management apparatus M, which is capable of communicating with the server SV. The management apparatus M is a display device which receives the notification from the server SV and displays the information on the determined result of the arithmetic portion 301 and the countermeasure information on the determined result on a display portion 401.

[Data Processing of the Sound Diagnostic System]

Figure 3:
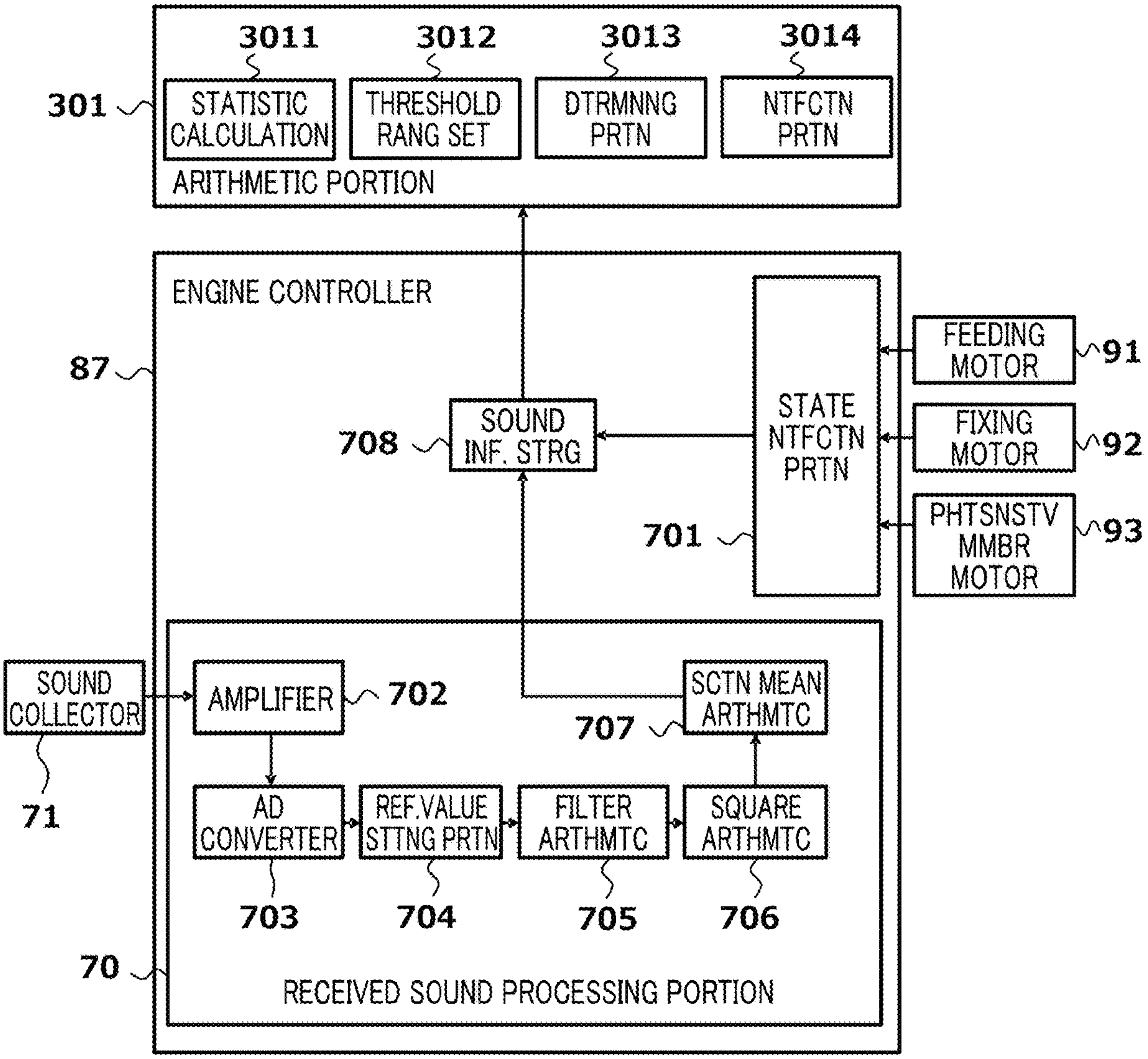
FIG. 3 is a schematic diagram of the sound diagnostic system in the Embodiments 1 through 3.

Next, a configuration on data processing of the sound diagnostic system 100 will be described using FIG. 3. FIG. 3 is a block diagram illustrating a portion of the sound diagnostic system 100 shown in FIG. 2. The engine control portion 87 is provided with a received sound processing portion 70, a sound information storage portion 708 and a state notification portion 701.

The received sound processing portion 70 processes a sound signal which is output by the sound collector 71 after receiving the sonic wave during a predetermined period, which will be described below. In other words, the received sound processing portion 70 may be referred to as a data generating means which generates sonic wave level data based on the sonic wave collected by the sound collector 71 (sound collecting portion). The received sound processing portion 70 includes an amplifying portion 702, an AD converting portion 703, a reference value setting portion 704, a filter arithmetic portion 705, a square arithmetic portion 706 and a section mean arithmetic portion 707.

The amplifying portion 702 amplifies the sound signal generated by the sound collector 71. The AD converting portion 703 converts the sound signal output by the amplifying portion 702 into a digital signal (digital value). Next, the reference value setting portion 704 subtracts a reference value from each value indicated by the digital signal from the AD converting portion 703, and extracts only components related to sound pressure fluctuation. This is because the sound signal output by the sound collector 71 includes a DC component and for removing the DC component. Incidentally, the reference value is set by the CPU 80.

The filter arithmetic portion 705 performs a filter processing by applying a filter to the digital signal, from which the DC component has been removed, from the reference value setting portion 704. Incidentally, the filter arithmetic portion 705 includes a plurality of filters and performs the filter processing using the filter set by the CPU 80. The square arithmetic portion 706 performs a square operation for the digital signal after the filter processing. The section mean arithmetic portion 707 performs a section mean operation for the digital signal after the square operation. In the present Embodiment, as an example, a time section, within which the section mean operation is performed, is 100 ms. Incidentally, a time length, in which the section mean operation is performed, is not limited thereto, but may be different for each measurement. By performing the square operation and the section mean operation, sonic wave level L, which indicates magnitude of the sound pressure fluctuation for each time section, is obtained. The section mean arithmetic portion 707 stores the sonic wave level L for each time section in the sound information storage portion 708.

The state notification portion 701 acquires an operating state of whether or not the feeding motor 91, the fixing motor 92 and the photosensitive member motor 93 are in operation, respectively. In addition, the state notification portion 701 associates the operating state of the feeding motor 91, the fixing motor 92, and the photosensitive member motor 93 in the time section with the sonic wave level L thereof and stores the information in the sound information storage portion 708. Hereinafter, each of the motors 91 through 93 may be referred to collectively as an actuator (operating portion).

The sound information storage portion 708 stores information indicating the operating state of the actuator and the sonic wave level L for each time section in which the sound collector 71 received the sound. Hereinafter, information including a plurality of continuous time sections, the operating state of the actuator in the plurality of continuous time sections, and the sonic wave level L in the plurality of continuous time sections is referred to as sound data.

In one sound data, print setting information such as a type of the filter applied by the filter arithmetic portion 705 and a type (or a basis weight) of the recording material P used for the print may be included. As such, in the present Embodiment, the sound data is generated in the image forming apparatus 1. The sound information storage portion 708 transmits the sound data including the sonic wave level based on the sonic wave and the operating state of one or more operating portions in each of the plurality of time sections in which the sound collector 71 collects the sonic wave to the server SV. The server SV receives the sound data acquired from the image forming apparatus 1 and stores the sound data in the storage device 302 (receiving portion).

A statistic calculating portion 3011 of the arithmetic portion 301 calculates a respective statistic P based on the sound data of each time section, as described below. A threshold range setting portion 3012 sets respective threshold value for each time section based on the respective statistic P and the operating state of each motor for each time section, as described below. A determining portion 3013 determines whether or not the abnormal sound is generated by using the respective threshold value for each time section, as described below. Furthermore, if the determining portion 3013 determines that the abnormal sound is generated, then the determining portion 3013 determines a unit to be replaced, which is generating the abnormal sound. A notifying portion 3014 notifies the determined result by the determining portion 3013. Incidentally, a notifying destination may be a user of the image forming apparatus 1 or the management apparatus M used by a dealer etc. who performs a maintenance or management of the image forming apparatus 1.

In the present Embodiment, the sonic wave within a period from a timing when the recording material P, which is printed lastly of the sheets printed in one print job, reaches a predetermined position until all the motors of the image forming apparatus 1 are stopped are collected and one sound data is generated. The timing when the recording material P reaches the predetermined position is a timing when a trailing end of the recording material P passes through a detecting position of the recording material detecting portion 90 (timing 1). In other words, the sound collector 71 (sound collecting portion) collects the sonic wave during the period when the image forming apparatus 1 is in operation. Specifically, the sound collector 71 collects the sonic wave including a period when the operating portion (actuator) is in operation and a period when the operating portion is not in operation, and the received sound processing portion 70 generates the sonic wave level data based on the signal from the sound collector 71. Incidentally, since the period from the timing 1 until all the motors of the image forming apparatus 1 are stopped includes a period when no recording material P is conveyed in a vicinity of the sound collector 71, it is a period when the sound collector 71 can receive operation sound of each motor inside the image forming apparatus 1 more easily. Therefore, by using the sound data of this period, it becomes possible to perform the determination of the generation of the abnormal sound with high accuracy.

Incidentally, the timing, the period, and a number of times in which the sound collector 71 performs the sound collection is not limited to the examples above, but may be changed as appropriate. For example, the sound data may be collected from just after the start of the feeding of the recording material P.

Incidentally, in the description below, the period from the timing when the trailing end of the last recording material P exits the recording material detecting portion 90 until all the motors of the image forming apparatus 1 are stopped may be referred to as a "post rotation period".

[Description for a Contacting/Separating Mechanism of the Primary Transfer Roller]

Figure 4:
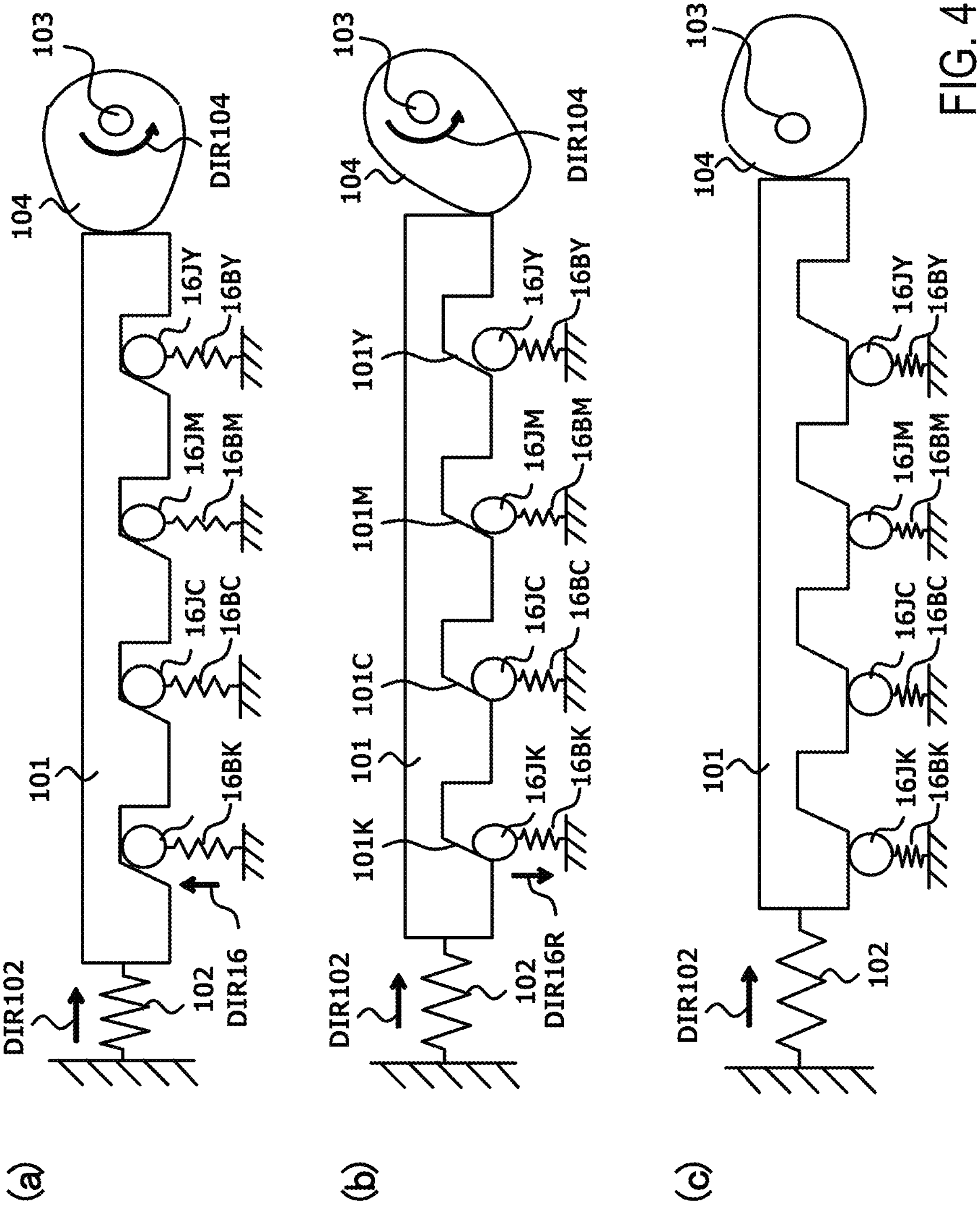
FIG. 4, part (a), part (b), and part (c), includes schematic cross-sectional views describing an outline of a contacting/separating mechanism of a transfer roller in the Embodiment 1.

The sonic wave collected in the post rotation period described above may include a transfer separation sound. Then, generation of the transfer separation sound will be described using FIG. 4. FIG. 4 illustrates a contacting/separating mechanism of the primary transfer roller 16 of the image forming apparatus 1.

The primary transfer roller 16 is in contact with the photosensitive drum 11 during the image formation, but is separated from the photosensitive drum 11 during non-image formation to prevent deformation of the primary transfer roller 16. As such, a mechanism for contacting or separating the primary transfer roller 16 from the photosensitive drum 11 is referred to as the contacting/separating mechanism.

The contacting/separating mechanism is provided at both end portions in a longitudinal direction of the primary transfer roller 16. Part (a) of FIG. 4 illustrates a state of the contacting/separating mechanism when the primary transfer roller 16 is in contact with the unshown photosensitive drum 11. Core metal portions 16JY, 16JM, 16JC and 16JK provided to the primary transfer rollers 16 are pressed against a slider 101 in an upper direction DIR16 by compression springs 16BY, 16BM, 16BC and 16BK of the primary transfer roller 16, respectively. The slider 101 is a member mounted on the image forming apparatus 1 so as to be movable only in a horizontal direction, and the slider is pressed by a compression spring 102 in a horizontal direction DIR102 (first direction) and against a cam 104. The cam 104 is a rotation member which is rotated in a direction DIR104 about a rotation shaft 103. The rotation shaft 103 is connected to a motor via an unshown gear and a mechanical clutch. When a separating operation is initiated, driving force of the motor is transmitted to the rotation shaft 103 via the unshown gear and the mechanical clutch, causing the cam 104 to be rotated. When the cam 104 is rotated, the slider 101 is moved in the horizontal direction DIR102 (first direction) due to an action from the compression spring 102 of the slider 101. To the slider 101, slopes 101Y, 101M, 101C and 101K are provided, and the core metal portion 16J of each primary transfer roller is moved downward along each of slopes 101Y, 101M, 101C and 101K is moved in a lower direction DIR16R with respect to the unshown photosensitive drum 11, and is separated from the unshown photosensitive drum 11 (part (b) of FIG. 4). Part (c) of FIG. 4 illustrates a state of the contacting/separating mechanism in which the separating operation is completed. Transition from a separated state to a contact state again is realized by rotating the cam 104 in the opposite direction to that of the separating operation.

Here, an impact sound may be generated during the separating operation shown in part (b) of FIG. 4. As described above, the compression spring 102 of the slider 101 is gradually released during the separating operation. In doing so, the compression spring 102 of the slider 101 acts on the cam 104 via the slider 101 to assist the rotation of the cam 104. By this assist, torque applied to the unshown gear and the mechanical clutch connected to the rotation shaft 103 comes to be in an opposite direction, which may cause the gear to be rotated by an amount of backlash provided in the unshown gear and the mechanical clutch, resulting in the generation of the impact sound. Hereinafter, this impact sound may be referred to as the transfer separation sound.

[Threshold Value Setting for Determination of the Abnormal Sound]

Figure 5:
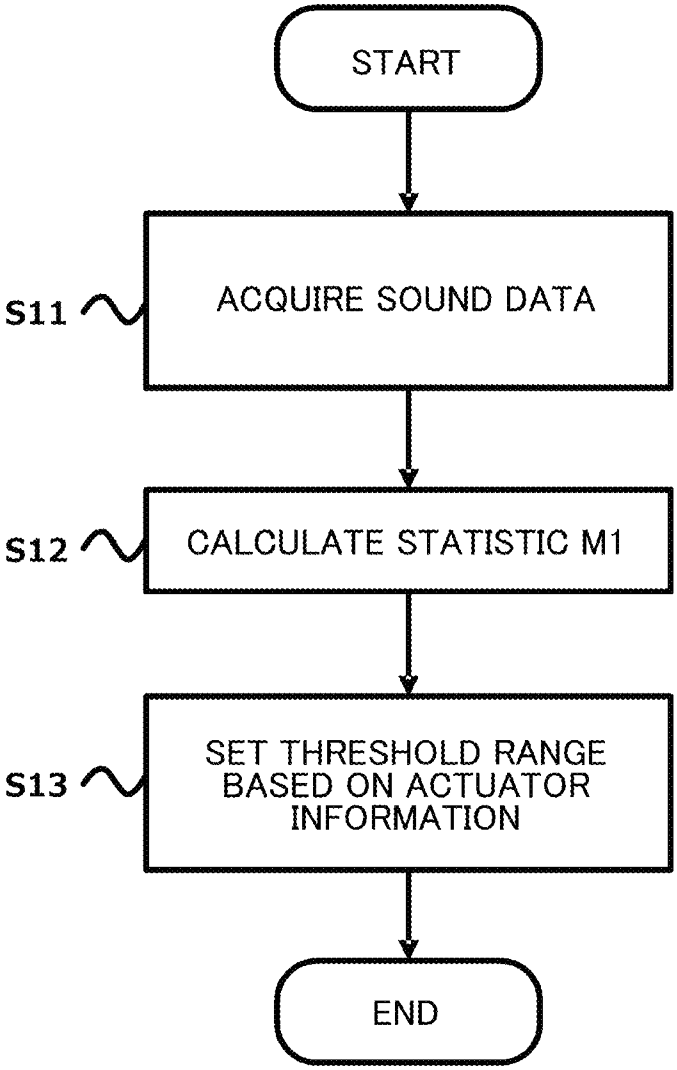
FIG. 5 is a flowchart describing a procedure for calculating a threshold range in the Embodiment 1.

Next, a method for a threshold value setting for determination of the abnormal sound will be described using FIG. 5. FIG. 5 is a flowchart illustrating a procedure up to the threshold value setting. In the determination of the abnormal sound in the present Embodiment, it is determined that the abnormal sound is generated when the sonic wave level exceeds a predetermined threshold value.

Figure 6A:
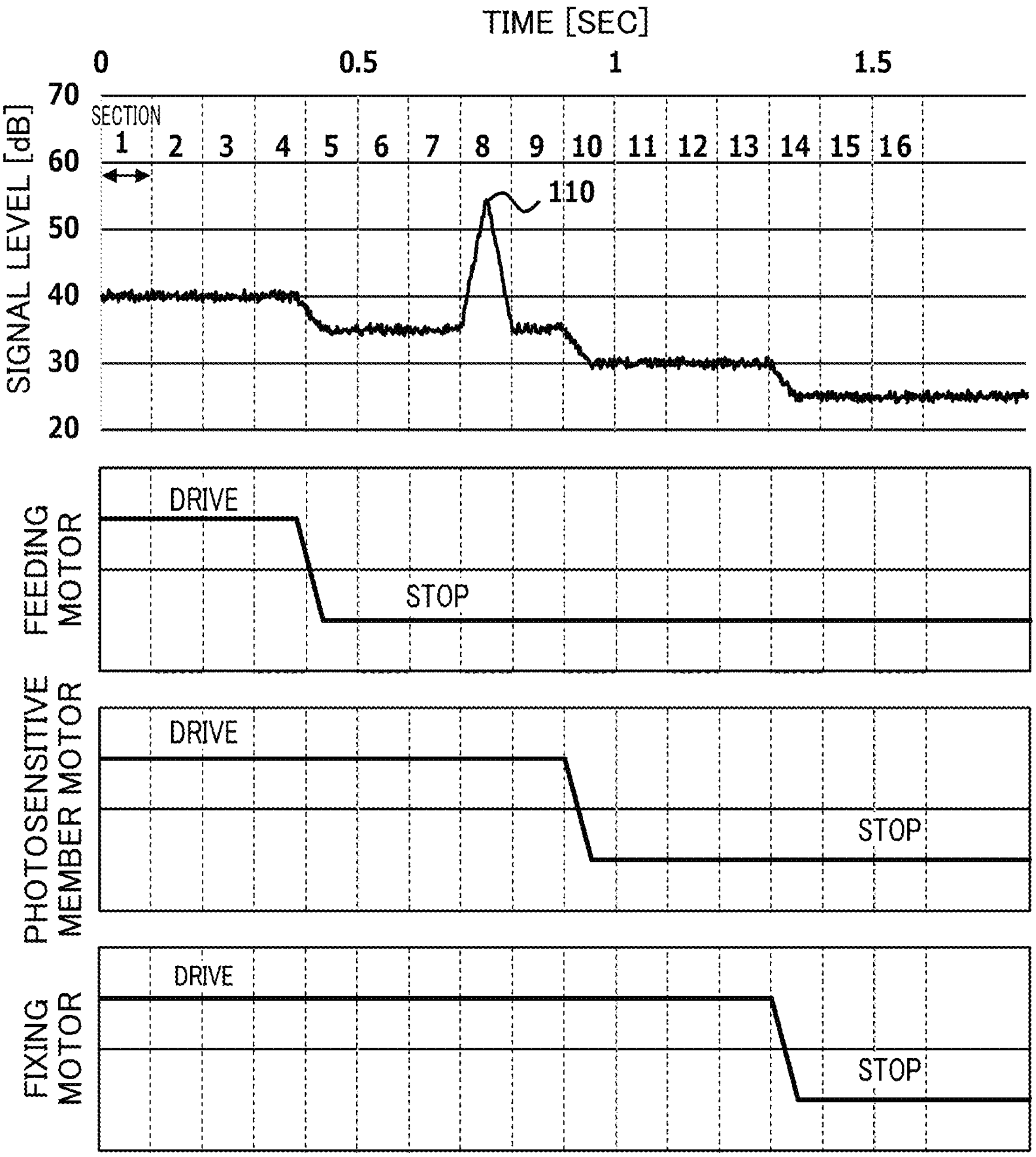
FIG. 6A includes graphs illustrating sonic wave level and operating state of actuators in the Embodiment 1.

FIG. 6A illustrates signal level [dB] output by the sound collector 71 and a temporal change of the operating state of each actuator (horizontal axis is time [sec]) in the post rotation period. In a waveform of the signal level shown in FIG. 6A, sounds upon timings when the feeding motor 91, the photosensitive member motor 93 and the fixing motor 92 are sequentially stopped and the transfer separation sound 110 described above are included.

Figure 6B:
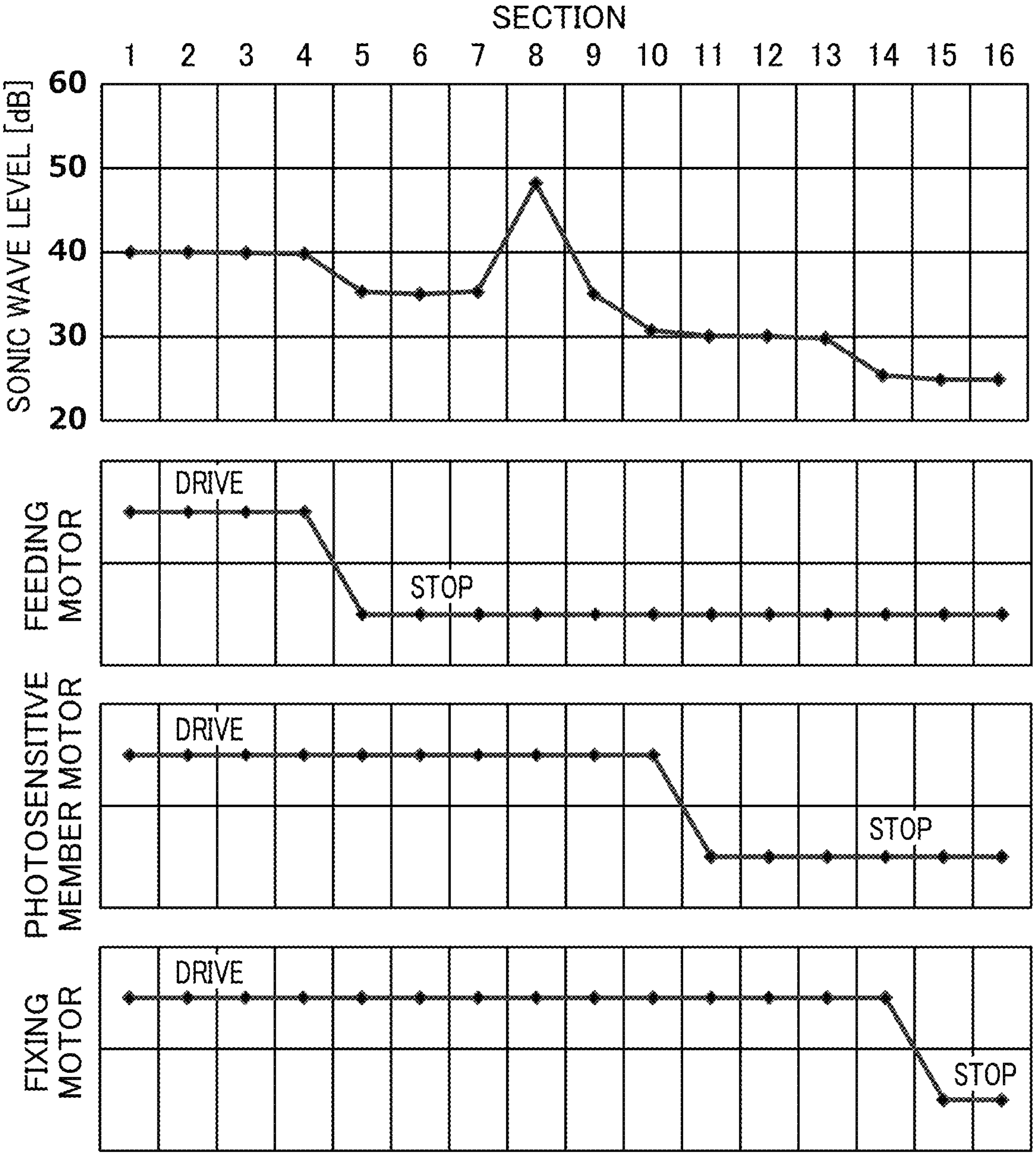
FIG. 6B includes graphs illustrating the sonic wave level and the operating state of the actuators in the Embodiment 1.

The received sound processing portion 70 processes the received signal collected during the post rotation period shown in FIG. 6A through the process described above, which causes the received signal to be divided in sixteen (16) time sections as shown in FIG. 6B, and calculates the sonic wave level [dB], to which mean processing is applied in each time section. On the other hand, the operating states of the actuators in each time section are detected by the state notification portion 701, and whether the actuator is in the operating state or in a non-operating state in each of the sixteen time sections are stored in the sound information storage portion 708 as shown in FIG. 6B. Incidentally, in a case in which the operating state of the actuator is changed in a middle of the time section, for example, a longer state in that time section is stored as the operating state in that time section. As such, the sonic wave level, to which the mean processing is applied in each of the sixteen time sections, and the operating states of the motors are stored (acquired) in the sound information storage portion 708 (S11 in FIG. 5). In other words, the sound information storage portion 708 may be referred to as an acquiring portion which acquires data including the sonic wave level based on the sonic wave and the operating states of one or more operating portions in each of a plurality of time sections in which the sound collector 71 collects the sonic wave.

Next, calculation of a statistic M1 in S12 of FIG. 5 will be described. When new N sound data are added, the statistic calculating portion 3011 of the server SV calculates the statistics P for each of the sixteen time sections based on these new N sound data. The statistic P may be, for example, a percentile value of N sound data. As an example, in a case in which N=100, a 95th percentile value may be used as the statistic P. In this case, when the sixteen time sections of one sound data are referred to as a section 1 through a section 16, a value of a fifth highest sonic wave level L out of the 100 sonic wave level L in the section 1 is the statistic P of the section 1.

Figure 7:
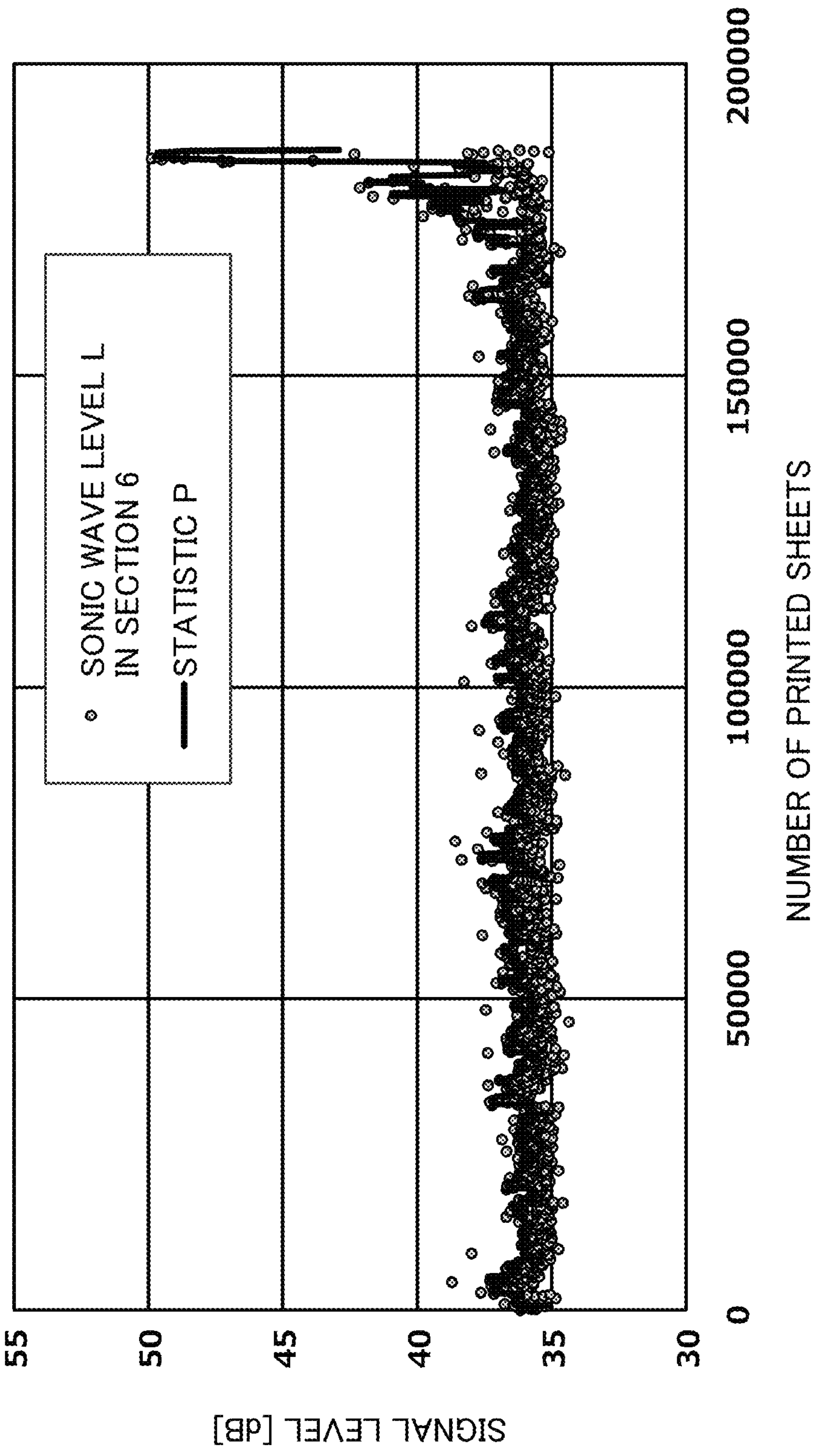
FIG. 7 is a graph illustrating the sonic wave level averaged in a section in the Embodiment 1 and a statistic thereof.

FIG. 7 is a graph illustrating the sonic wave level L and the statistic P in the section 6 versus a number of printed sheets. By calculating the statistic P in this manner, it becomes possible to diagnose the abnormal sound with a smaller amount of data than by dealing with the sonic wave level L as it is. Incidentally, the calculating method of the statistic P is not limited to the above method. For example, the statistic P may be any percentile value or a maximum value of N sonic wave level L. Furthermore, the statistic P may be a mean value of a certain number from the highest of N sonic wave level L.

When a number of calculated statistics P reaches M, the statistic calculating portion 3011 calculates the statistic M for each of the sixteen time sections based on the M statistics P. The statistic M may be, for example, a mean value of M statistics P. Here, in the description below, the statistic M used for setting of the threshold range, which will be described below, is referred to as the statistic M1. The statistic M1 may be referred to as a first sonic wave level based on the sonic wave collected in a first period by the sound collector 71, for example.

Figure 8:
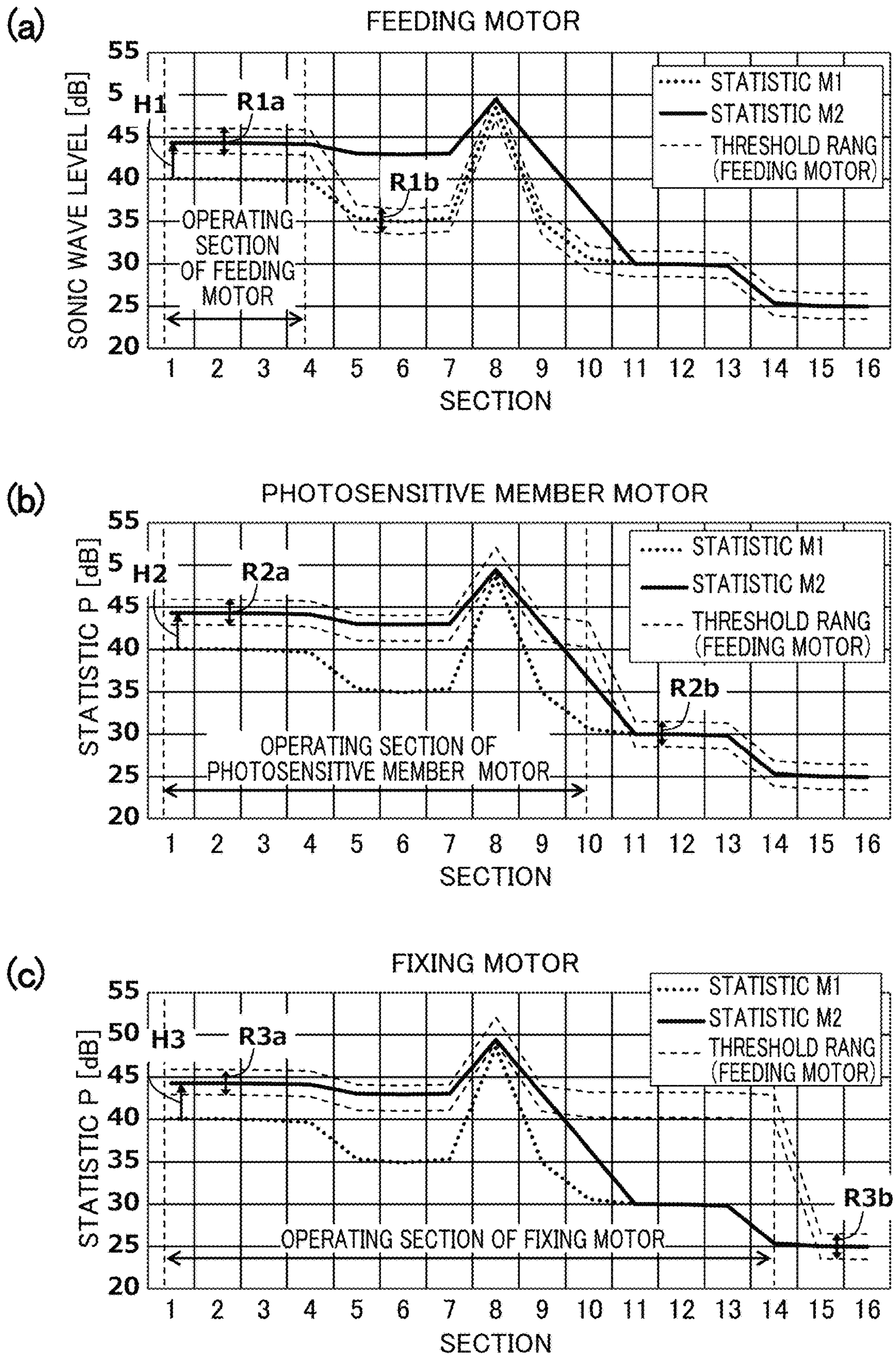
FIG. 8, part (a), part (b), and part (c), includes graphs illustrating statistics and the threshold range for each section in the Embodiment 1.

Next, the setting of the threshold range in S13 will be described. The threshold range setting portion 3012 sets the threshold range for each actuator based on the statistic M1. In other words, the threshold range setting portion 3012 is a threshold value generating portion which generates the threshold value based on the first sonic wave level based on the sonic wave collected in the first period by the sound collector 71. FIG. 8, part (a), part (b) and part (c), includes graphs in which the threshold range is set for each actuator. In sections in which the target actuator is in operation, the threshold range is a predetermined range Ra which is centered on a value in which a predetermined value H is added to the initial statistic M1. In addition, in sections in which the target actuator is not in operation, the threshold range is a predetermined range Rb which is centered on the statistic M1. For example, part (a) of FIG. 8 is a graph illustrating the threshold range for the feeding motor 91.

The feeding motor 91 is in operation in the section 1 through the section 4 and not in operation after the section 5, as shown in FIG. 6B. In the sections 1 through 4, in which the feeding motor 91 is in operation, a predetermined value H1 is added to the statistic M1, and a range R1*a*, which is centered on the added value (M1+H1), is the threshold range.

Here, the predetermined value H1 is added to antilogarithm of decibel (dB). For example, when H1=20000, and in a case in which the statistic M1=40 dB, a central value of the threshold range R1*a* is $10\times\log_{10}(10\hat{}(40/10)+20000)=44.8$ dB. In addition, a range with respect to the center value may be given in decibels (dB) and, for example, in a case in which the range is given as ±1.5 dB, the threshold range R1*a*=the center value (44.8 dB)±1.5 dB, i.e., from 43.3 to 46.3 dB. In the section 8, in which the statistic M1 is 49 dB, the threshold range R1*a* is from 48.5 to 51.5 dB when calculated in the same way with H1=20000. In this manner, the predetermined value is added to the respective antilogarithm of the statistic M1 (logarithm) of each section. In other words, the predetermined value H1 is set so as to be smaller as the statistic M1 (first sonic wave level) is larger. By this, it becomes possible to generate the threshold value with higher accuracy upon performing determination of the abnormal sound than a method in which a predetermined decibel value (logarithm) is added to the respective statistic M1 of each section. As shown in part (b) and part (c) of FIG. 8, the same threshold range can be set for the photosensitive member motor 93 and the fixing motor 92 as for the feeding motor 91. In this manner, for each time section, the threshold range is set based on the statistic M1 and the operating state of the target actuator.

Incidentally, the setting method of the threshold range described here is an example, and it is also possible to set the threshold range individually corresponding to various conditions (filter, mean time, etc.) under which the sonic wave signal is processed. Furthermore, the added value H from the initial statistic M1 and the ranges Ra and Rb from the center value may be different for each actuator. For the added value H described above, a value set in advance is used, however, the added value H can also be set, after acquiring the initial statistic M1, to be different corresponding to the initial statistic M1. For example, in part (b) of FIG. 8, the added value H may be determined so as an upper limit of the threshold range to be 45 dB in the section 6, in which the initial statistic M1 is the smallest of the sections where the photosensitive member motor 93 is in operation. In this case, by determining the added value H in the section in which the initial statistic M1 is the smallest, i.e., the section which includes as little operation sound as possible other than that of the photosensitive member motor 93, it becomes possible to detect the abnormal sound of the photosensitive member motor 93 with higher accuracy.

[Determination of the Abnormal Sound]

Next, a method for the determination of the abnormal sound by the determining portion 3013 will be described. Incidentally, the statistic M calculated using the sonic wave which is collected after the sonic wave which is used to calculate the statistic M1 described above is referred to as a statistic M2. The statistic M2 may also be referred to as a second sonic wave level, which is the sonic wave level based on the sonic wave collected by the sound collector 71 in a second period after the first period. The determining portion 3013 is a determining portion which determines the cause of the abnormal sound by comparing the second sonic wave level with the threshold value described above.

FIG. 9 is a view illustrating, for each actuator in the graphs shown in FIG. 8, the operating state and whether or not the statistic value M2 is within the threshold range for each time section. For example, in the feeding motor 91, in the time sections 1 through 4, in which the operation thereof is ON, it is indicated that the statistic M2 is within the threshold range. On the other hand, in the time sections 5 through 16, in which the operation thereof is OFF, the time sections in which the statistic M2 is within the threshold range are the time section 8 and the time sections 11 through 16.

In the present Embodiment, a conforming rate, which is rate of a number of time sections, in which the statistic M2 is within the threshold range, with respect to a total number of time sections, is calculated. The conforming rate and a summed conforming rate, which will be described below, are indexes which indicate a degree to which the statistic M2 is within the threshold range. For example, in the present Embodiment, assume that a total number of the sections, in which the actuator is in operation, is A, and a number of time sections of A, in which the statistic M2 is within the threshold range, is B. In addition, a total number of the sections, in which the actuator is not in operation, is C, and a number of the time sections of C, in which the statistic M2 is within the threshold range, is D. Thus, the conforming rate when the actuator is in operation may be expressed as B/A. In addition, the conforming rate when the actuator is not in operation may be expressed as D/C. In addition, the summed conforming rate is defined as (B+D)/(A+C).

For example, the total number of the sections, in which the feeding motor 91 is in operation (operation thereof is ON) is four (A=4), and the number of the sections of A, in which the statistic M2 is within the threshold range, is four (B=4), thus the conforming rate B/A=100%. Similarly, calculating for a period of non-operation (operation thereof is OFF), the conforming rate is D/C=58.3% (C=12, D=7). In addition, the summed conforming rate is (B+D)/(A+C)=11/16=68.8%. Similarly, upon calculating the summed conforming rate for the photosensitive member motor 93 and the fixing motor 92, the summed conforming rate are 93.8% and 68.8%, respectively.

The summed conforming rate represents likelihood to be the cause of the abnormal sound, and a possible unit, which is the cause of the abnormal sound, may be listed as a candidate based on the conforming rate. For example, in a case of FIG. 9, since the summed conforming rate of the photosensitive member motor 93 is the highest, it is possible to determine that the abnormal sound is likely to be the abnormal sound of a component which is driven by the photosensitive member motor 93. Incidentally, as for the conforming rate, it may be configured to determine presence or absence of the likelihood of the cause of the abnormal sound by setting a threshold value for the conforming rate. Furthermore, the conforming rate during operation and the conforming rate during non-operation may each be weighted to calculate the summed conforming rate.

In the above method, the determination of the abnormal sound is performed by setting the threshold range to calculate the conforming rate during non-operation, however, as another method, it may also be possible to perform the determination of the abnormal sound by setting a threshold value only for a lower limit. For example, it is possible to detect the generation of the abnormal sound by determining whether or not the statistic exceeds the threshold value for the lower limit in the sections in which the operation of the target actuator is ON. In a case in which a number of target actuators is small or in a case in which a number of actuators which are in operation at the same time is small, it is possible to narrow down the cause of the abnormal sound through this method.

Figure 10:
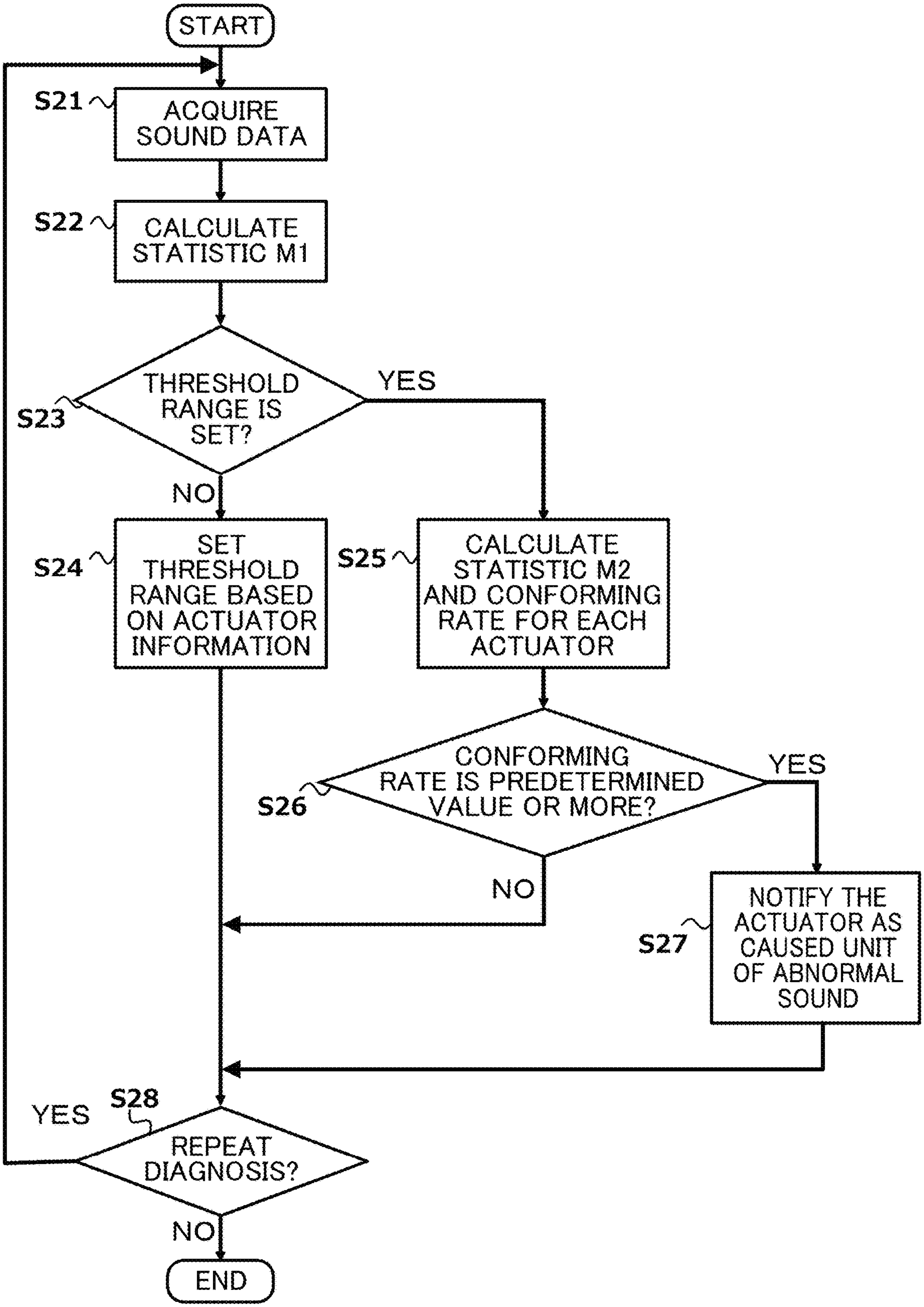
FIG. 10 is a flowchart describing a procedure for identifying a unit causing the abnormal sound in the Embodiment 1.

Next, a flow of the determination of the abnormal sound in the present Embodiment will be described using FIG. 10. FIG. 10 is a flowchart of the determination of the abnormal sound in the present Embodiment. Since the processes of S21, S22 and S24 are the same as those of S11, S12 and S13 in FIG. 5, description thereof will be omitted. In S23, the threshold range setting portion 3012 determines whether or not the threshold range is set, and if the threshold range is not set, then the threshold range setting portion 3012 sets the threshold range based on actuator information (S24). If the threshold range is set, in S25, the threshold range setting portion 3012 calculates the statistic M2, the conforming rate and the summed conforming rate for each actuator. In S26, if there is an actuator whose conforming rate is a predetermined value or more, then in S27, the determining portion 3013 determines that a component which is driven by the actuator whose conforming rate is the predetermined value or more is the cause of the abnormal sound and proceeds the process to S28. In addition, the notifying portion 3014 notifies the determined result of the determining portion 3013 and the countermeasure information on the determined result. By this, it is possible to notify the user of the presence or absence of the abnormal sound and the unit causing the abnormal sound, and encourage replacement or repair of the unit. In S26, if the conforming rate is less than the predetermined value, then the process is proceeded to S28. In S28, if the diagnosis is repeated in S28, then the process is returned to S21 and the diagnosis of the abnormal sound can be performed continuously.

As described above, according to the present Embodiment, the sound diagnostic system 100 includes one or more operating portions and the sound collecting portion which collects the sonic wave so as to include the period when the operating portion is in operation. In addition, the sound diagnostic system 100 also includes data generating means, which generates the sonic wave level data based on the sonic wave collected by the sound collecting portion, and the acquiring portion, which acquires first data which is the sonic wave level data for the first period and second data which is the sonic wave level data for the second period after the first period (sound information acquiring portion 708). In addition, the sound diagnostic system 100 generates the statistic M1 based on the first data and, furthermore, generates the threshold range based on the statistic M1.

Incidentally, in the present Embodiment, the sound data is divided into sixteen time sections in order to reduce data transmitted to the server SV. However, the present invention is not limited to performing the process of dividing the sound data into finite time sections. For example, the sonic wave level is treated as data for a continuous time, and the threshold range is set based on the sonic wave level. As to the conforming rate to the threshold range, upon a new sonic wave level being input, the conforming rate may also be calculated from a time when the sonic wave level is within the threshold range.

In addition, in the present Embodiment, the system in which the server SV is provided separately from the image forming apparatus 1 is described, however, the present invention is not limited thereto. For example, it is possible to perform the determination of the abnormal sound with the image forming apparatus alone by providing the arithmetic portion 301 in the image forming apparatus.

As described above, according to the Embodiment 1, it becomes possible to determine the cause of the abnormal sound with high accuracy.

Embodiment 2

Figure 11:
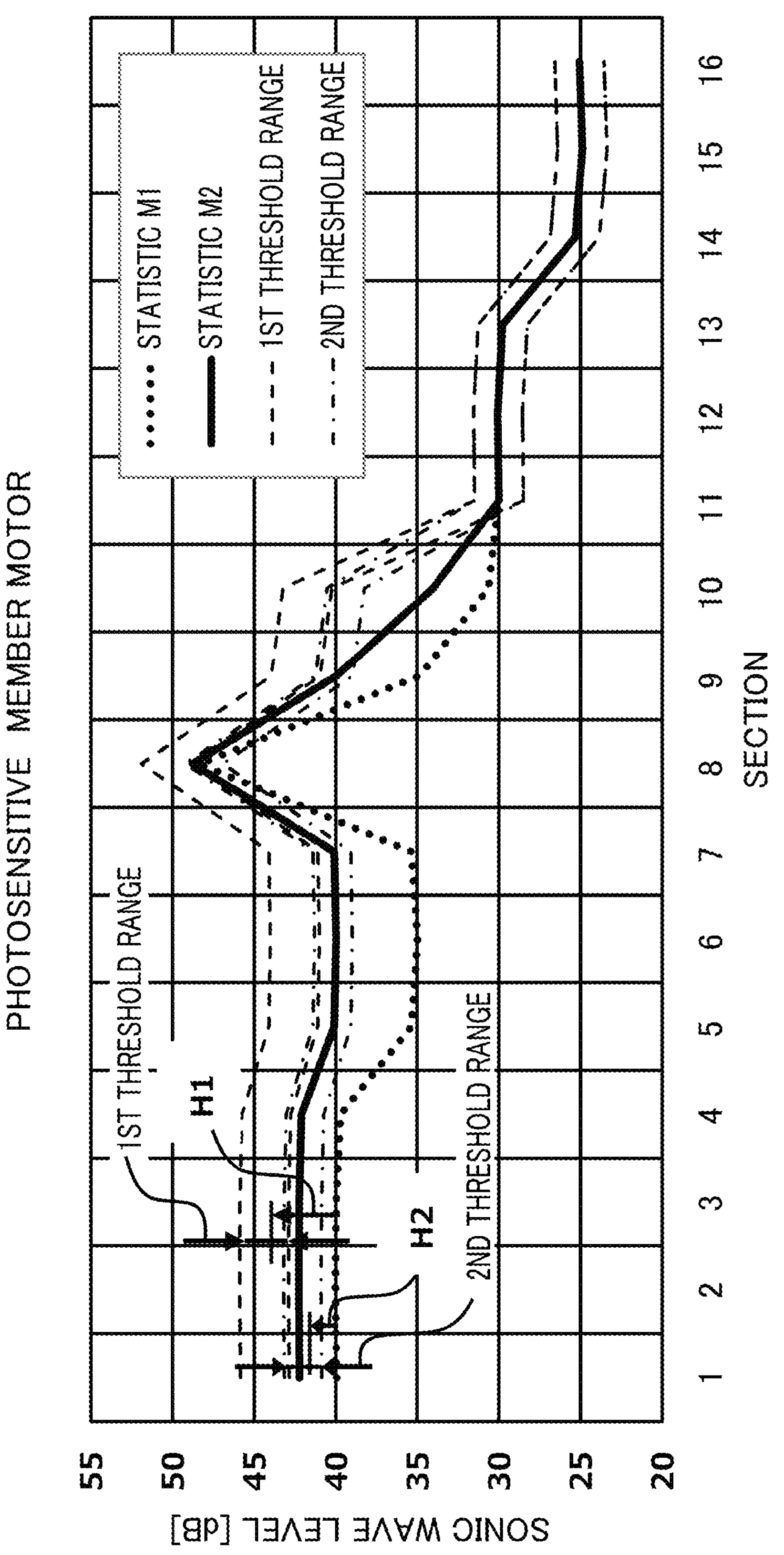
FIG. 11 is a graph illustrating statistics and threshold ranges for each section in the Embodiment 2.

Next, an Embodiment 2 will be described with focusing on differences from the Embodiment 1. In the present Embodiment, it is possible to determine magnitude of the abnormal sound by providing a plurality of threshold ranges. FIG. 11 is a graph in which two threshold ranges of a first threshold range and a second threshold range are provided for the photosensitive member motor 93. A statistic M2 is a statistic for a case in which minor abnormal sound is generated in the photosensitive member motor 93. Here, the first threshold range and the second threshold range have different center values for each range in each section. By providing the second threshold range whose center value is smaller than that of the first threshold range, it becomes possible to detect smaller abnormal sound.

A method for setting the first threshold range and the second threshold range will be described. Each threshold range can be set from the initial statistic M1, as in the Embodiment 1. For example, predetermined values H1 and H2 for calculating the center values of the first threshold range and the second threshold range are given as, H1=20000 and H2=8000, in the antilogarithm of decibel (dB), respectively. Then, in the section 1, since the initial statistic M1 is 40 dB, the center value of the first threshold range is $10\times\log_{10}(10^\wedge(40/10)+20000)=44.8$ dB, and the center value of the second threshold range is $10\times\log_{10}(10^\wedge(40/10)+8000)=42.5$ dB. And upon setting the threshold ranges as ranges of the center values ±1.5 dB, respectively, the first threshold range is from 43.3 to 46.3 dB, and the second threshold range is from 41.0 to 44.0 dB. The first threshold range and the second threshold range may have overlapped range. As for the other sections, the threshold ranges can be set in the same manner. In addition, as for the feeding motor 91 and the fixing motor 92 as well, a plurality of the threshold ranges may be set in the same manner.

Next, a determination method of the abnormal sound will be described with reference to FIG. 12. FIG. 12 is a view illustrating, based on FIG. 11, for the photosensitive member motor 93, the operating state and whether or not the statistic M2 is within the threshold ranges in each time section. As in the Embodiment 1, the total numbers of sections and the numbers of sections in which the statistic M2 is within the threshold range is counted for each of the first threshold range and the second threshold range, and the conforming rate is calculated, respectively. For example, in FIG. 12, the summed conforming rate for the first threshold range is 37.5%, and the summed conforming rate for the second threshold range is 93.8%. It is possible to determine that a smaller abnormal sound is generated than a case of conforming to the first threshold range since the summed conforming rate to the second threshold range, which has a smaller center value of the threshold range, is greater.

As described above, in the present Embodiment, it is possible to determine the smaller abnormal sound by providing the plurality of threshold ranges. By this, for example, it becomes possible to prompt a manager of the management apparatus M to prepare for component replacement at a stage of more minor abnormal sound, and, in a case in which a more major abnormal sound is detected, it becomes possible to prompt the manager to replacement or repair of the component with more urgency. As described above, according to the Embodiment 2, it becomes possible to determine the cause of the abnormal sound with high accuracy.

Embodiment 3

Figure 13:
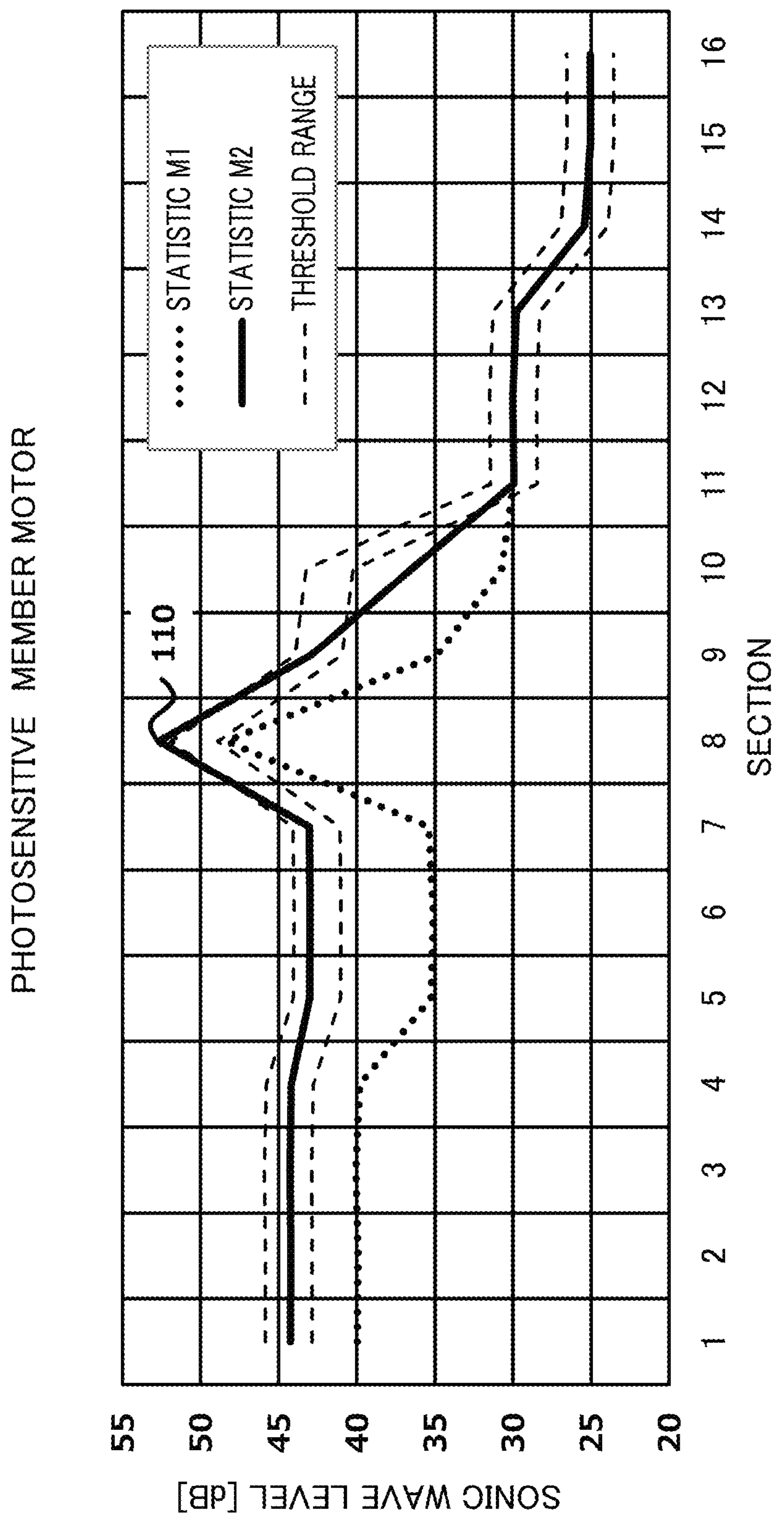
FIG. 13 is a graph illustrating statistics and threshold range for each section in the Embodiment 3.

Next, an Embodiment 3 will be described with focusing on differences from the Embodiment 1 and the Embodiment 2. In the present Embodiment, a method for removing the operation sounds other than that of the target actuator will be described. FIG. 13 is a graph illustrating a statistic for each time section in the Embodiment 3.

FIG. 13 is a view illustrating the statistics and the threshold range in a case in which the transfer separation sound 110 is greater than the initial statistic M1 upon acquiring the statistic M2 when the abnormal sound is generated in the photosensitive member motor 93. The transfer separation sound 110 described above may vary in magnitude due to effect from sliding states of the cam 104 and the slider 101 as well as fluctuation in the rotation speed of the cam 104. For example, in a section 8 of FIG. 13, the statistic M2 is out of the threshold range due to variations in the transfer separation sound 110.

Next, a determination method of the abnormal sound in the present Embodiment will be described with reference to FIG. 14. FIG. 14 is a view illustrating, based on FIG. 13, for the photosensitive member motor 93, the operating state and whether or not the statistic M2 is within the threshold range in each time section. Hereinafter, excluding a particular section from a target of the calculation is referred to as "mask". First, "no mask" shows results where the conforming rate is calculated for all time sections as in the Embodiment 1 and the Embodiment 2, and the summed conforming rate thereof is 87.5%. On the other hand, "with mask" shows results where the conforming rate is calculated by excluding the section 8 in which the transfer separation sound 110 is generated from the target of the calculation, and the summed conforming rate thereof is 93.3%.

Incidentally, the section to be masked may be determined in advance as described above or determined after acquiring the initial statistic M1. For example, in a case in which the initial statistic M1 has a large value, it may be masked by determining that other operation sounds are included. In addition, it is also possible to determine the section in which the operation sounds are generated based on operation timings of motors or solenoids, and mask the section. Furthermore, it may be possible for the masked section to be more than one, and to be set for each target actuator individually.

Thus, by masking the section in which the statistic may vary due to the effect from the operation sounds other than that of the target actuator, the conforming rate upon the abnormal sound is generated is increased, and it becomes possible to perform the determination of the abnormal sound without being affected by the operation sounds other than that of the target actuator. As described above, according to the Embodiment 3, it becomes possible to determine the cause of the abnormal sound with high accuracy.

Other Embodiments

The present invention may also be realized by a process in which a program realizing one or more functions of the Embodiments described above is supplied to the system or the device via a network or the storage medium, and a one or more processors in a computer of the system or the device read out and execute the program. In addition, the present invention can also be realized by a circuit which realizes one or more functions thereof (e.g., ASIC).

Incidentally, in the Embodiments 1 through 3, the actuators are described as an example of the operating portion. However, the operating portion is not limited to the actuators, but may be any member or unit which is operated in conjunction with the operation of the image forming apparatus.

The disclosure of the present embodiments includes the following constitution examples.

Constitution 1

A sound diagnostic system comprising an image forming apparatus for forming an image on a recording material and an information processing apparatus capable of communicating with the image forming apparatus, wherein the image forming apparatus comprises:

one or more operating portions;

a sound collecting portion configured to collect a sonic wave so as to include a period when the operating portion is in operation;

an acquiring portion, in each of a plurality of time sections when the sonic wave is collected by the sound collecting portion, configured to acquire a data including sonic wave level based on the sonic wave and an operating state of the one or more operating portions; and a transmission portion configured to transmit the date to the information processing apparatus, and wherein the information processing apparatus comprises:

a receiving portion configured to receive the data;

a threshold value generating portion configured to generate a threshold value by adding a predetermined value to a first sonic wave level which is the sonic wave level based on the sonic wave collected by the sound collecting portion in a first period; and a determining portion configured to determine a cause of an abnormal sound by comparing a second sonic wave level which is the sonic wave level based on the sonic wave collected by the sound collecting portion in a second period after the first period and the threshold value, and wherein the predetermined value is set so as to be smaller as the first sonic wave level is larger.

Constitution 2

The sound diagnostic system according to Constitution 1, wherein the predetermined value is added to an antilogarithm of the first sonic wave level which is logarithm.

Constitution 3

The sound diagnostic system according to Constitution 1, wherein the threshold value has a predetermined threshold range, and wherein the determining portion determines the cause of the abnormal sound by calculating, in the plurality of time sections, a number of time sections in which the second sonic wave level is in the predetermined threshold range.

Constitution 4

The sound diagnostic system according to Constitution 2, wherein the acquiring portion generates the sonic wave level based on the sonic wave collected by the sound collecting portion in a period including the period when the operating portion is in operation and a period when the operating portion is not in operation.

Constitution 5

The sound diagnostic system according to Constitution 1, further comprising a notification portion configured to notify a determined result of the determining portion or countermeasure information based on the determined result of the determining portion in a case in which the determining portion determines the cause of the abnormal sound, and a display device configured to receive a notification from the notification portion and display the determined result of the determining portion or the countermeasure information based on the determined result of the determining portion.

Constitution 6

The sound diagnostic system according to Constitution 1, each of the one or more operating portions drives a component included by the image forming apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-206317 filed on Dec. 6, 2023, which is hereby incorporated by reference herein in its entirety.

What is claimed is:

1. A sound diagnostic system comprising an image forming apparatus for forming an image on a recording material and an information processing apparatus capable of communicating with the image forming apparatus, wherein the image forming apparatus comprises:

one or more operating portions;

a sound collecting portion configured to collect a sonic wave so as to include a period when the operating portion is in operation;

an acquiring portion, in each of a plurality of time sections when the sonic wave is collected by the sound collecting portion, configured to acquire a data including sonic wave level based on the sonic wave and an operating state of the one or more operating portions; and a transmission portion configured to transmit the data to the information processing apparatus, and wherein the information processing apparatus comprises:

a receiving portion configured to receive the data;

a threshold value generating portion configured to generate a threshold value by adding a predetermined value to a first sonic wave level which is the sonic wave level based on the sonic wave collected by the sound collecting portion in a first period; and a determining portion configured to determine a cause of an abnormal sound by comparing a second sonic wave level which is the sonic wave level based on the sonic wave collected by the sound collecting portion in a second period after the first period and the threshold value, and wherein the predetermined value is set so as to be smaller as the first sonic wave level is larger.

2. The sound diagnostic system according to claim 1, wherein the predetermined value is added to an antilogarithm of the first sonic wave level which is logarithm.

3. The sound diagnostic system according to claim 2, wherein the acquiring portion generates the sonic wave level based on the sonic wave collected by the sound collecting portion in a period including the period when the operating portion is in operation and a period when the operating portion is not in operation.

4. The sound diagnostic system according to claim 1, wherein the threshold value has a predetermined threshold range, and wherein the determining portion determines the cause of the abnormal sound by calculating, in the plurality of time sections, a number of time sections in which the second sonic wave level is in the predetermined threshold range.

5. The sound diagnostic system according to claim 1, further comprising a notification portion configured to notify a determined result of the determining portion or countermeasure information based on the determined result of the determining portion in a case in which the determining portion determines the cause of the abnormal sound, and a display device configured to receive a notification from the notification portion and display the determined result of the determining portion or the countermeasure information based on the determined result of the determining portion.

6. The sound diagnostic system according to claim 1, each of the one or more operating portions drives a component included in the image forming apparatus.

* * * * *